(No Model.)  5 Sheets—Sheet 1.
W. McK. JENNE.
TYPE WRITING MACHINE.

No. 478,964. Patented July 12, 1892.

Witnesses;
Sidney P. Hollingsworth
Horace A. Dodge.

Inventor;
WILLIAM McK. JENNE
by Dodge Sons
Attys.

(No Model.)

W. McK. JENNE.
TYPE WRITING MACHINE.

No. 478,964.

5 Sheets—Sheet 2

Patented July 12, 1892.

Witnesses;

Inventor:
WILLIAM McK. JENNE
by Dodge & Sons,
Attys.

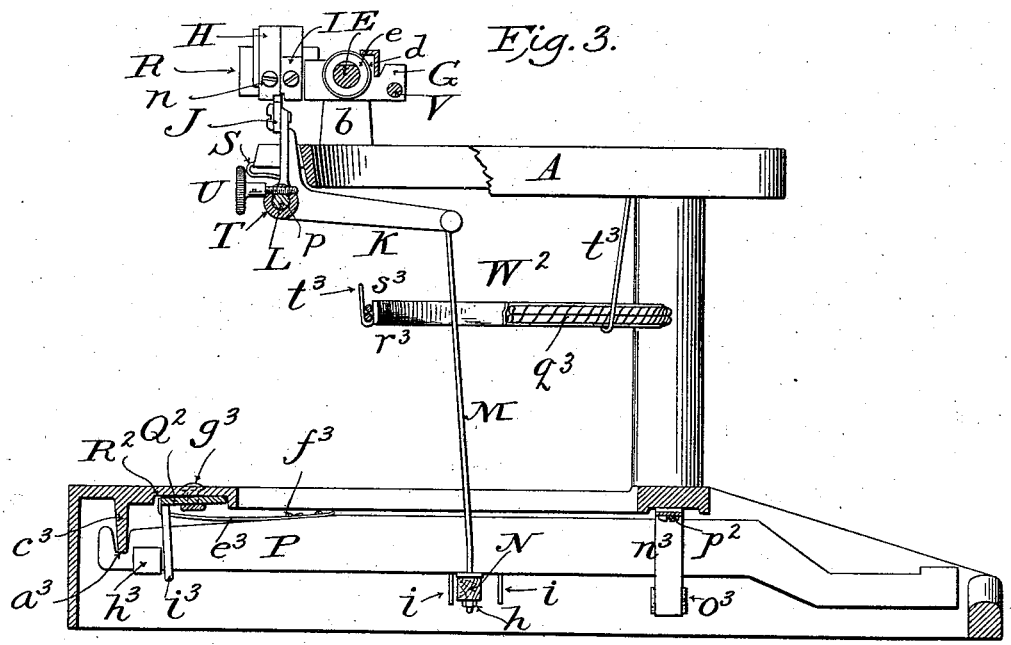
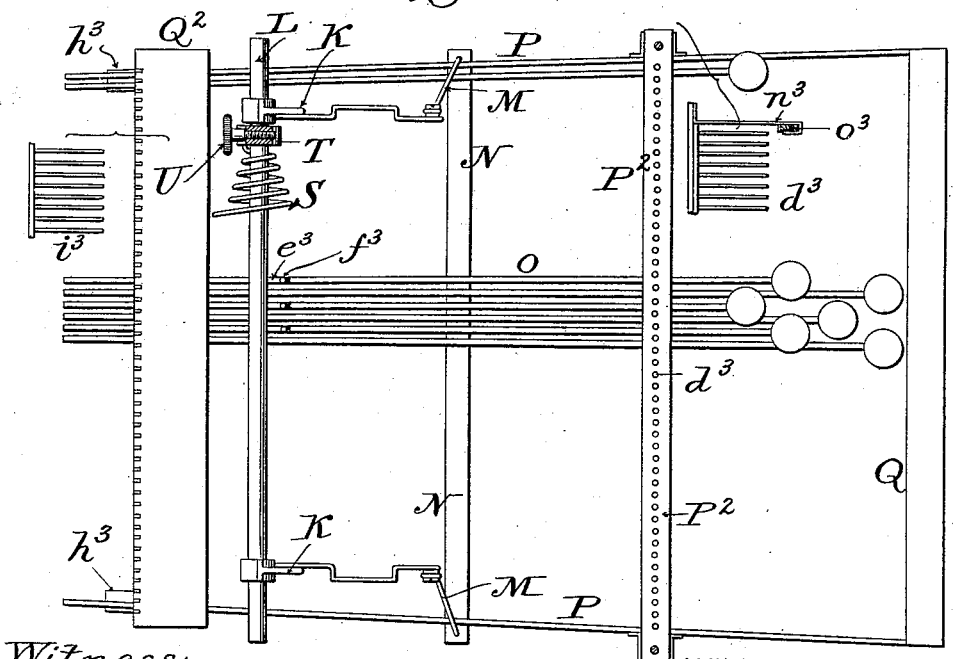

(No Model.) 5 Sheets—Sheet 4.

W. McK. JENNE.
TYPE WRITING MACHINE.

No. 478,964. Patented July 12, 1892.

Witnesses:
Arthur Ashley
Horace A. Dodge.

Inventor:
WILLIAM McK. JENNE
by Dodge Sons,
Attys.

(No Model.) 5 Sheets—Sheet 5.
W. McK. JENNE.
TYPE WRITING MACHINE.
No. 478,964. Patented July 12, 1892.
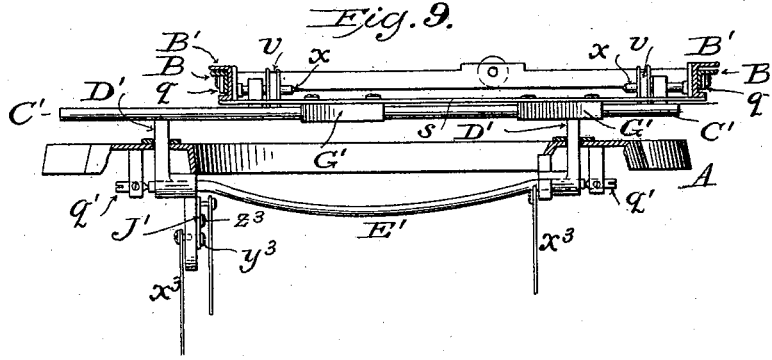
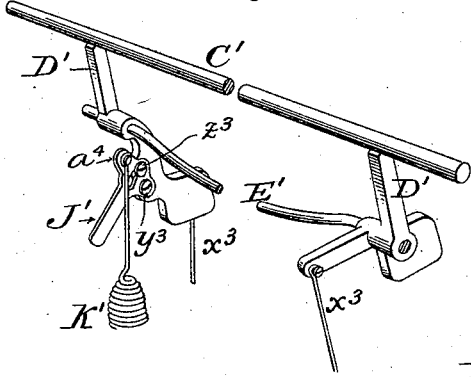
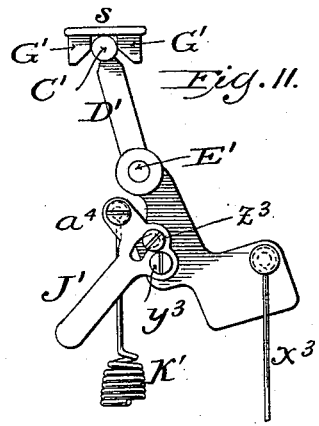
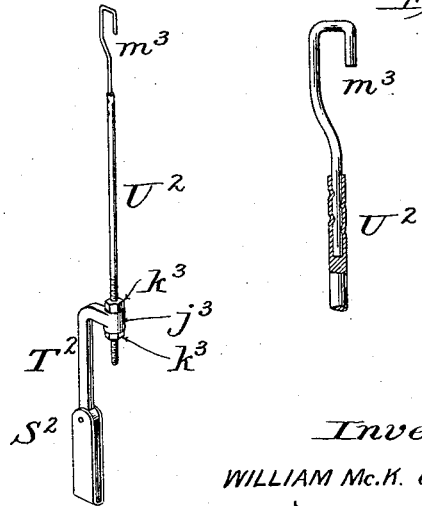
Witnesses:
Arthur Ashley
Horace A Dodge.
Inventor:
WILLIAM McK. JENNE
by Dodge & Sons,
Attys.

UNITED STATES PATENT OFFICE.

WILLIAM McK. JENNE, OF ILION, NEW YORK.

TYPE-WRITING MACHINE.

SPECIFICATION forming part of Letters Patent No. 478,964, dated July 12, 1892.

Original application filed January 20, 1888, Serial No. 261,408. Divided and this application filed May 28, 1892. Serial No. 434,776. (No model.) Patented in England May 16, 1888, No. 7,269.

*To all whom it may concern:*

Be it known that I, WILLIAM MCK. JENNE, a citizen of the United States, residing at Ilion, in the county of Herkimer and State of New York, have invented certain new and useful Improvements in Type-Writing Machines, (for which I have received British Letters Patent No. 7,269, dated May 16, 1888,) of which the following is a specification, the present specification being a division of an application, Serial No. 261,408, filed by me January 20, 1888.

This invention relates to that class of typewriting machines in which a series of type bars or levers, each bearing two type or printing characters, is arranged in a circular series and caused to strike at one or the other of two points, the paper-sustaining roll or platen being shifted to receive the blow of one or the other of the type, as required.

The invention relates to the various parts of the machine and is designed to improve the action of its various parts with a view to rendering its work more exact, to lessen the play and wear of parts, to decrease the power required to operate the machine, to facilitate adjustment, renewal, or repair of parts, and generally to perfect those parts which have in practical use of the machine been found susceptible of improvement.

Figure 1:
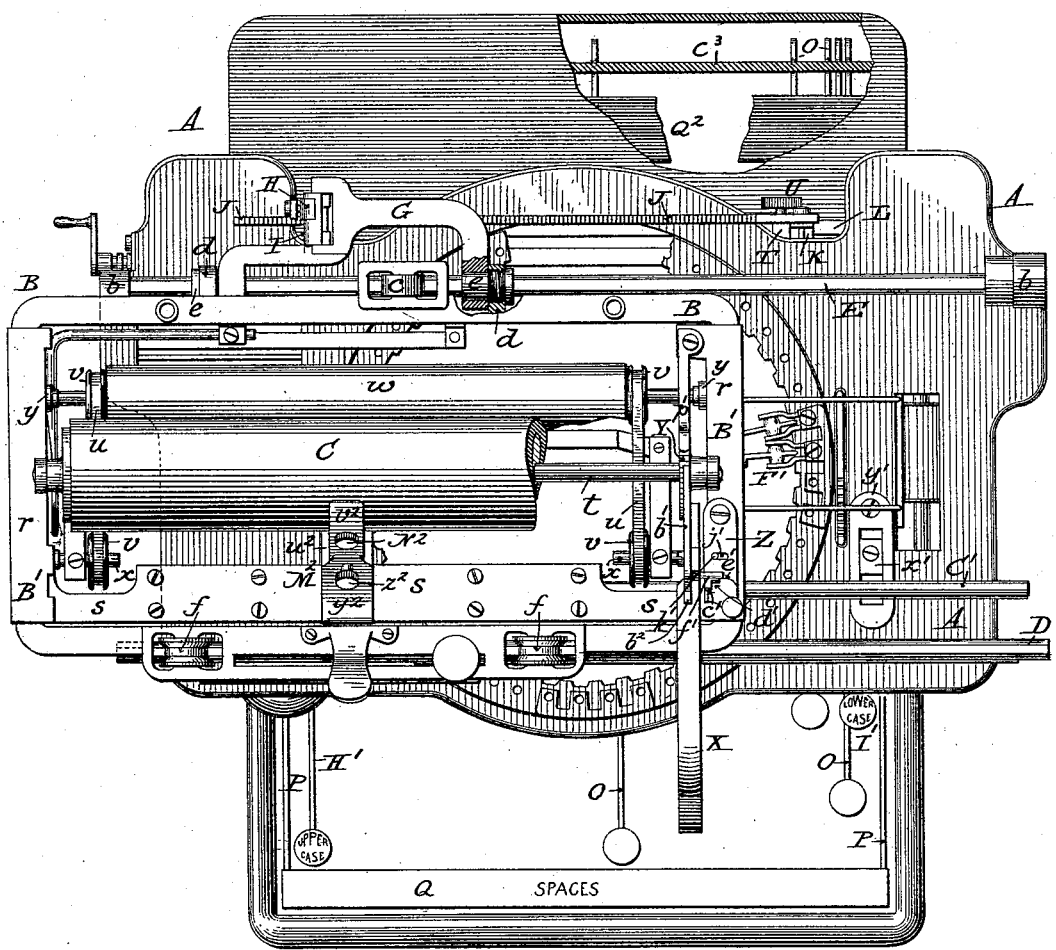
Figure 2:
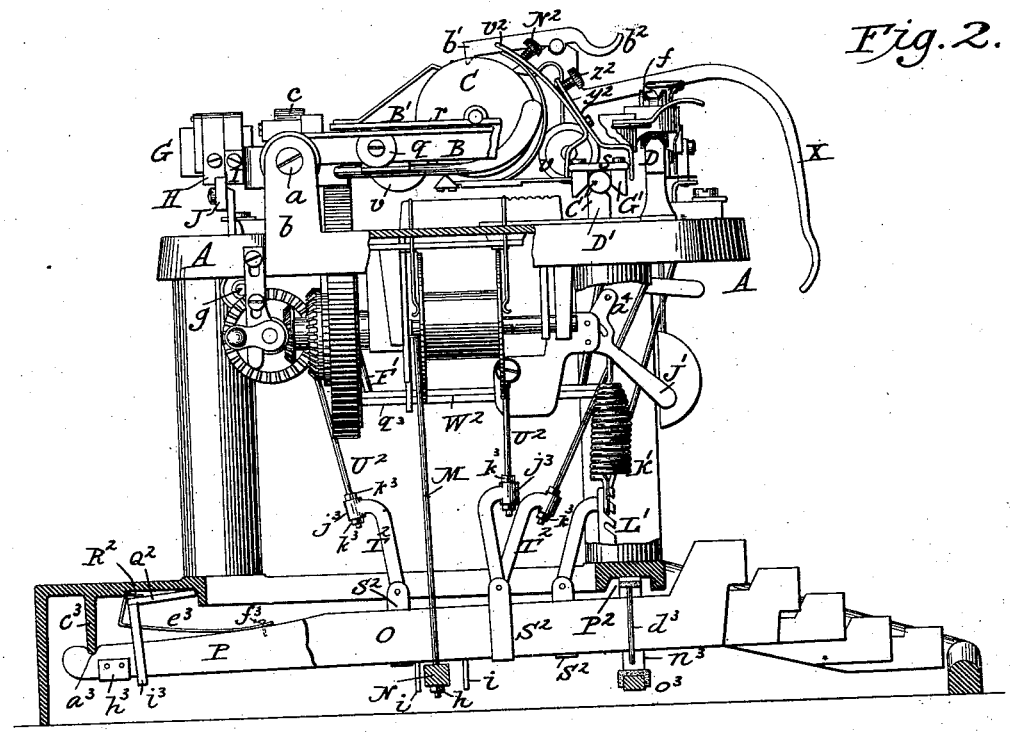

Referring to the accompanying drawings, Figure 1 is a top plan view of a machine embodying the improvements; Fig. 2, a side elevation of the same, partially broken away to show parts hidden by the main frame; and Figs. 3 to 14, inclusive, detail views of various parts hereinafter explained.

A indicates the main frame of the machine, which is of usual form, and B B' the traveling carriage, which is movable as a whole from side to side upon the frame A and the rollerframe or part B' of which is capable of being shifted backward and forward upon the main carriage B to bring the roller or platen C over one or the other of the two printing characters with which each type-bar is furnished.

The carriage B is guided in its travel back and forth by two rods or bars D and E, Figs. 1, 2, and 3, the former secured rigidly to posts or standards rising from the top of frame A at or near its front and the latter being tapped at its ends to receive screws $a$, which serve as journals for said rod, the screws passing through and their heads being seated in holes formed through uprights $b$ at or near the rear side of the frame A. The bar E being thus supported is free to rock or turn and forms a hinge-rod for the entire carriage, permitting the latter to be raised to or thrown slightly back of a vertical position to expose to view the line being printed.

The bar E is of D form in cross-section, as shown in Fig. 3, one face being planed off or otherwise removed from a previously-cylindrical rod, so as to form a flat bearing-face to receive a supporting-roller $c$, by which the rear side of the main carriage B is sustained while in working position. The said roller $c$ is carried in a yoke or small open frame cast integral with the rear bar of the carriageframe B, as seen in Fig. 1, and consequently tips with the carriage-frame as the latter is raised or lowered, and, being maintained always in contact with rod or bar E, it will be seen that said rod must turn in unison with the frame, which is the reason for arranging it to rock or turn in its supports.

As shown in Figs. 1, 2, and 3, the rear bar of the frame B is furnished with two perforated lugs or ears $d$, which are tapped to receive tubular bushings $e$, preferably of brass or other alloy or metal, which, sliding upon the bar E, will give but little friction and wear but slightly. The bushings $e$ are of a length sufficient to reach through and project some distance beyond the ears $d$, the projecting portions forming pivots or hinge-pins for a tipping frame G, carrying feed-dogs H and I, which alternately engage with a vibrating rack-bar J, and thus bring about the step-bystep advance of the carriage, the rack-bar being actuated through the depression of the finger-keys, as hereinafter explained. The front guide-bar D is beveled or reduced in width at its upper edge, and the front bar of carriage-frame B is furnished with two supporting and guiding rollers $f$, which are Vgrooved to cause them to fit and travel upon the bar D without any play in the direction of their axes. Owing to this arrangement, the main carriage B is prevented from moving toward or from the front of the machine, and the rear side of the carriage-frame being held at just the proper distance from the rear supporting rod or bar E by the roller c it follows that if the bushings e are once adjusted to encircle without actually bearing upon rod D they will continue thus out of contact so long as the guiding-rollers f rest upon the bar D; but when the rollers are lifted from said bar, as in throwing up the carriage, the bushings will bear upon said rod and the frame and rod will move together. By thus relieving the hinge-rod E of the duty of guiding the carriage and of all wear, except that due to the flat-faced roller c, resting upon its upper face, the thrust of the shifting supplemental carriage B′ is taken off the hinge-rod, and the tendency to interfere with the nice adjustment and action of the spacing devices is overcome. The hinge-rod, instead of being worn at short intervals corresponding with the teeth of the rack-bar, remains smooth and its pivots unworn, and the movements of the carriage continue free and certain.

Heretofore the step-by-step advance of the carriage has been effected by means of two dogs—one rigid and the other yielding—carried by a vibrating or oscillating lever or shaft, such as the shaft L, Figs. 3 and 4, which is connected with a cross-bar, such as the bar P, extending across the machine beneath the key-levers, said dogs being arranged to enter alternately into engagement with a rack similar to J, attached to and movable with the carriage. Under the present plan this arrangement is reversed, the dogs H I′ being attached to and movable with the carriage B and the rack J being carried by the shaft or rod L. This change, together with certain modifications of the dogs, greatly improves the spacing mechanism and renders the carriage capable of being drawn back to the starting-point without separating the dogs and rack-bar and yet without injury to either.

J indicates the rack-bar, which is formed with a series of equidistant teeth along its upper edge and is carried by the upright arms of two levers K, which are made fast upon a common rock-shaft or rod L carried at its end upon taper pivots g, Fig. 2, secured to lugs cast upon frame A. The pivots occasion but little friction and afford ready means of adjustment to compensate for wear, it being important to avoid any play of the rod or shaft upon its pivots other than the simple rocking action.

The horizontal arms of the elbow-levers K are each provided with a stud at or near the outer end, upon which is hung a link or wire rod M, each rod extending downward to near the lower line of frame A and threaded at the lower end to receive a nut h, by which to retain upon the rods or links a cross-bar N, through which the rods pass, as shown in Figs. 2, 3, and 4.

The bar N passes beneath all the key-levers O and under the levers P, which carry the spacing-bar or finger-piece Q for spacing between words, and is consequently depressed whenever any key or the space-bar is pressed down. It is held against moving toward the front or rear of the machine by means of pins i, projecting downward from the levers P of space-bar Q, as shown in Figs. 2 and 3.

Rack-bar J is thrown and normally held back to the limit of its vibration and in line with yielding dog H by means of a spring S, Figs. 3 and 4, which is preferably made in the form of a spiral coil, and one end of which is caused to engage with or is attached to the main frame A or other fixed part of the machine, while the other end is attached to a collar T, encircling the rod L aforesaid, and adjustable about said rod by means of a thumb-screw U, turning loosely in the collar and engaging with worm-teeth p, cut in or upon the rod L, as shown in Fig. 3. By turning the screw to the right or left the collar may be turned about the rod and the tension of the spring varied as desired.

The above arrangement of spring S and adjustable tension device U T p is equally applicable to the rock-shaft or rod L, whether the latter is employed to carry the rack-bar J into or out of engagement with the dogs H and I or whether it is employed, as hereinbefore set forth, to carry the dogs into and out of engagement with the rack-bar, the one arrangement being the reverse of the other.

As already mentioned, the main carriage B is drawn forward by a spring, and is moved back by hand for the commencement of a new line, and the supplemental carriage B′ is made to shift toward and from the front of the machine to bring the paper over the capitals or the small letters of the type-bars. To permit this shifting to be readily effected and with slight expenditure of force, the main carriage I is provided at each end with two rollers q q, upon which rest flanges of the supplemental frame or roller B′, as shown in Figs. 2 and 9, other flanges along the lower side of the end bars of frame B′ engaging beneath the end bars of the main frame B, and thereby preventing the former from being lifted or from falling off the latter, as it might otherwise do in shifting the supplemental frame B′ or in tipping up the carriage.

The frame of the main carriage B being cast in one piece, it is necessary to apply the end bars r of supplemental frame B′ thereto before said end bars are finally joined together by the front bar s and platen or roll-shaft t, which, with the end bars r, make up the supplemental frame B′.

C indicates the platen or paper-sustaining roll, which is mounted upon the platen shaft or rod t and is free to turn thereon or therewith as said shaft is fixed or left free to turn, the former plan being ordinarily adopted. The paper to be printed upon passes over a roller or cylinder w in rear of the platen C, Fig. 1, thence beneath the platen, and upward in front of the same, falling back over the same, as usual, and to keep the paper smooth and insure its even and uniform feeding throughout its width bands or belts $u$, preferably of rubber, are carried about grooved pulleys $v$ in front of platen C, the upper portion of the belt bearing against the paper and pressing it against the platen.

Figure 5:
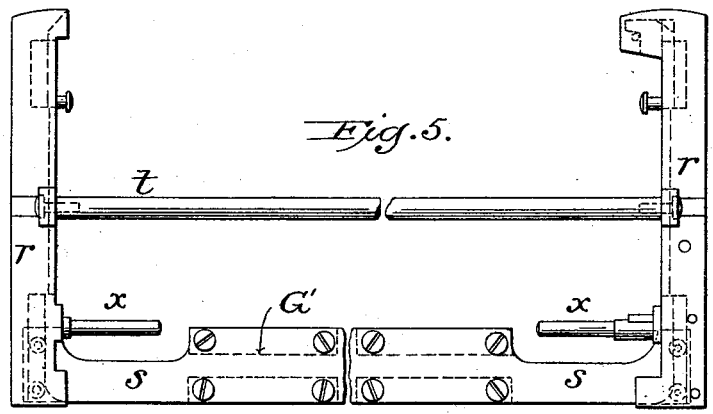
Figure 6:
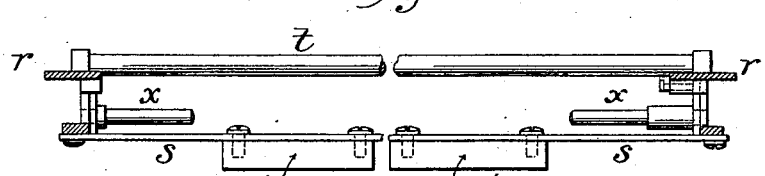
Figure 8:
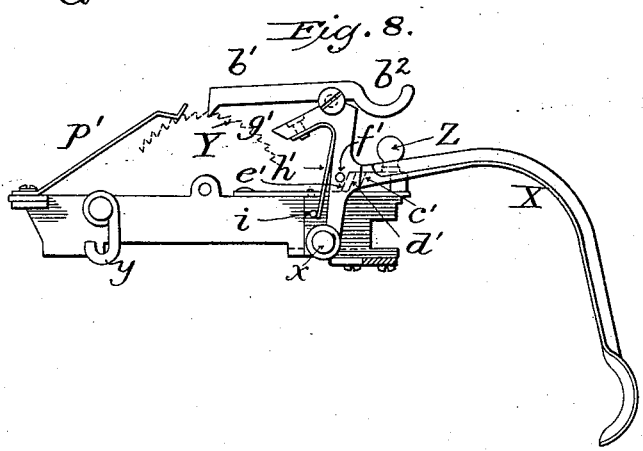

Prior to this invention the front pulleys $v$ were mounted upon a rod or shaft extending from one end bar of the shifting supplemental frame B' to the other, a construction of which necessitated the detachment of the rod before a worn or broken band could be renewed. This necessity is obviated by mounting the pulleys $v$ upon short stems $x$, projecting toward each other from the opposite end bars $r$ of the frame B', as shown in Figs. 1, 5, and 9. The side play of the pulleys is very slight, owing to the fact that the belts or bands $u$, which pass about them pass also about the rear pulleys $v$, which have no side play. Hence there is no liability of the front pulleys $v$ becoming dismounted. Yet when necessary the bands may be readily slipped off the pulleys and over the ends of the stems $x$. The journals of roll $w$ are carried in hooks or hook-shaped hangers $y$, pivotally attached to the end bars $r$ of shifting frame B', as shown in Figs. 1 and 8, and hence said roll may be readily removed, as heretofore, and thus the ready and complete removal and replacement of the bands $u$ are permitted. The paper, being held by the bands $u$ closely against the platen C, which is ordinarily faced with rubber, is advanced after the completion of a line by a short partial rotation of the platen or roll C, which is effected by a hand-lever X, pivoted upon one of the stems $x$ of the shifting supplemental carriage B', as shown in Figs. 1, 2, and 8, and carrying a dog $b'$, which engages with the teeth of a ratchet-wheel Y, secured upon the end of the platen-roll C.

It is desirable to be able to vary the line-spacing for different kinds of work, in some cases placing them very close together, in others giving them about the spacing of ordinary legal-cap paper, and again placing them still farther apart. To provide for such variation and insure precisely the spacing desired, a stop-plate Z is employed, Figs. 1 and 8, having three shoulders $c'$, $d'$, and $e'$ and pivoted at one end to the horizontal top face of shifting frame B' in position to engage and limit the motion of a stud or pin $f'$, projecting from the side of the hand-lever X above the pivot of said lever, as shown in Fig. 8. The form of the lever is also shown in said figure and in Fig. 2, upon referring to which figures it will be seen to consist of an upright portion rising directly from the pivot, then bending forward and downward to form a stop-arm $g'$, which, as the lever is thrown forward by means of its forwardly and downwardly extending tail or hand piece, is brought into contact with the ratchet-wheel Y, and thereby prevented from going farther forward. Riveted or otherwise secured to the rear face of the upright stem or portion of the hand-lever X is a spring $h'$, which, bearing against a pin or stud $i'$ of the shifting frame B', tends to throw the lever and its stop-arm $g'$ away from the ratchet-wheel Y, and consequently to carry the dog $b'$ back over the teeth of said wheel to prevent its engagement with a fresh tooth preparatory to another forward movement to turn the roll or platen. If only a narrow space is desired between the lines, the stop-plate Z is moved to such position that its shoulder $e'$—the one nearest its pivot and nearest roll C—shall stand in the path of pin $f'$. If a wider space is desired, the plate is swung out far enough to remove shoulder $e'$ from and to bring shoulder $d'$ into the path of the said pin $f'$; or if still wider spacing be desired the plate is swung still farther aside, carrying shoulder $d'$ out of and bringing shoulder $c'$ into the path of the pin $f'$. To prevent the plate Z from moving beyond the distance necessary to give the adjustments thus stated, a slot $j'$ is made in it to receive a pin or stud $k'$, projecting from the top of shifting frame B', and to retain the stop-plate at the precise adjustment desired it is made thin and elastic, so that it may spring slightly up from frame B', and is furnished with three notches or recesses $l'$, $m'$, and $n'$, Fig. 15, corresponding to the shoulder $c'$ $d'$ $e'$, so that as the plate is moved to one or another position one or another of the notches or recesses shall come directly over a rounded or beveled stud, rising from frame B', the two entering into engagement, and thereby holding the plate against accidental movement. Obviously the arrangement may be reversed, the notches or recesses being made in frame B' and the projection upon the lower face of spring-plate Z. A suitable knob or button is furnished by which to move the plate Z from one position to another. The dog $b'$ is formed with a thumb-piece or extension $b^2$ in rear of its pivot, by which it may be lifted out of engagement with the ratchet-wheel, if at any time it be desired to rock the hand-lever X without turning the roll or platen C. A spring-detent $p'$, secured to the frame B' and bearing upon ratchet-wheel Y, returns the roll to proper position if carried too far or short of such position when feeding the paper through by hand or in case the lever fails to act properly.

The shifting carriage B' is held normally at one or the other extreme of its movement upon carriage B by reason of engagement with a shifting bar or rod C', Figs. 1, 2, and 9, which is carried by two elbow-levers D', secured upon a rock-shaft E', carried at its ends by pointed pivots $q'$, passing through holes in lugs of frame A, and secured by set-screws below the top or platform of the latter. The upright arms of the levers D' pass through holes or slots in the top plate of the main frame A, and the rock-shaft E' is curved to pass outside and clear of the type-levers F', which latter are elbow-levers grouped about a circular opening in the table or top of the machine, through which they rise and fall as usual.

Figure 7:
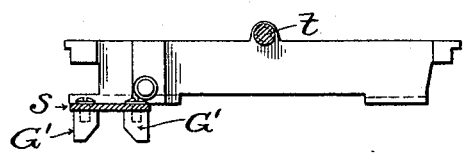

Riveted or otherwise firmly secured to the under face of the front bar $s$ of shifting frame B' are four beveled blocks G', Figs. 2, 7, and 10, arranged in pairs, with just enough space between the blocks of each pair to receive the shifting rod or bar C', the inner or opposing faces of the blocks being perpendicular and parallel down to a point somewhat below the axis of rod or bar C' and beveled from said faces downward and outward. The inclined faces are sufficiently extended to insure the bearing of one or the other upon the shifting rod or bar C', so that if the carriage-frame be turned up the inclined faces bearing upon the rod or bar C' shall bring the shifting carriage exactly to place, the blocks G' passing down upon opposite sides of the rod or bar C', as above explained. Heretofore these blocks have been made quite short and have been supported by arms extending inward from a rod or shaft carrying the front pulleys $v$; but under the present plan of construction the shaft is omitted and short studs or stems substituted, as before mentioned, the blocks being secured to the front bar $s$ of the shifting carriage B'. This arrangement makes the blocks rigid and insures accuracy and certainty of adjustment of the shifting carriage and completely obviates the liability of cramping or binding of the blocks or their getting out of alignment.

For some classes of work it is desirable to have the shifting frame B' held in such position that only capital letters shall print, unless the frame be manually shifted and held to print a small letter or letters; but ordinarily it is desirable to have the shifting frame occupy such position as will cause the small letters to print when the frame is manually shifted and held in position for the printing of capitals. Heretofore a spring connected with the shifting bar or rod C' by means of a swinging yoke or equivalent device has been employed to hold the shifting rod and frame B' in the desired position, the yoke serving to throw the spring to one or the other side of the pivotal axis of the levers D', which carry the shifting rod or bar C', thereby causing said spring to hold the shifting rod or bar and the shifting frame B' in either of the two positions mentioned. The present construction embodies the same general idea, but materially improves the action of the yoke or shifter, and obviates the rapid wear or cutting away of certain parts incident to the former plan.

In the improved construction illustrated in Figs. 2, 9, 10, and 11 it will be seen that one of the elbow-levers D' has its horizontal or lateral extension in front of its axis or of the supporting-shaft E', while the other has its horizontal or lateral arm in rear of the axis of said shaft, both levers being weighted in rear of said shaft to counterbalance the weight of the rock-shaft E', so that the shifting rod or bar C' may in itself be, as nearly as practicable, in a state of equilibrium or devoid of tendency to fall either forward or backward.

From the lateral or rearwardly-extending arm of the elbow-lever D' at one side of the machine, preferably the left, a link or draw-rod $x^3$ passes down to and is connected with a finger key or lever H', Fig. 1, and from the forwardly-extending arm of the other lever D' a similar link or draw-rod $x^3$ passes to and connects with a finger key or lever I'. By depressing the finger-key H' the shifting rod or bar C', and consequently the shifting platen-frame, may be thrown from a forward to a backward position if not already so adjusted, and similarly, if in its rearward adjustment, it may be moved forward by depressing lever I'.

J', Fig. 10, indicates a rocking lever attached to the side of one of the elbow-levers D' by a pivot-screw $y^3$ in line with the axis of rock-shaft E' and shifting rod or bar C'. The lever, which may be conveniently cut from sheet or plate steel or iron, is slotted to permit the passage through it of a stop-screw $z^3$, by which the throw of the lever is limited, the play being sufficient to carry its upper arm $a^4$ to opposite sides of a line passing through the axis of a pivot $q'$ and rock-shaft E'. Connected with this upper arm $a^4$ of the lever J' is a coiled spring K', the lower end of which is engaged in one or another notch of an upright post or stem L', Fig. 2, secured to the main frame A just above the level of the keyboard. By hooking the spring into one or another notch of post L its tension may be varied, as desired.

If it be desired to hold the shifting frame forward, as is required for printing small letters under the usual arrangement of the characters upon the type-levers, the handle of the rocking lever J' is depressed, bringing said lever to the position shown in Figs. 2 and 10 and causing the spring to act in a plane forward of the axis of rock-shaft E', thereby throwing shifting-bar C' and supplemental frame B' forward and retaining them in such position. When so adjusted, the shifting rod and frame B' may be thrown back without disturbing lever K' by merely depressing key-lever H'.

If desired to adjust frame B' and its platen C to print capitals, the rocking lever J' is raised, the spring K' is thereby caused to act in rear of rock-shaft E', and the shifting rod and platen-frame B' are carried back, but may be moved forward when necessary by depressing key-lever I'. The rocking lever J' works smoothly and easily and is convenient to the operator, its handle extending outward just in front of the upright portion of the main frame A, as shown in Fig. 2. The throw of the shifting rod or bar C' is controlled and limited by slotted plates $x'\ y'$, clamped upon the platform or top of main frame A by clamping-screws, the plates being arranged one within a slot in the other, as shown in Fig. 1, whereby each is kept from shifting laterally.

For the purpose of holding envelopes, cards, and other bodies too short to reach from one band $u$ to the other a device $M^2$ is provided, what is commonly termed an "envelope-holder" $M^2$. (See Figs. 1 and 12.) This consists of a spring arm or plate $u^2$, attached at its upper end to a supporting-arm $v^2$, curved to conform to the curvature of roll or platen C and furnished at its free end with a roller $w^2$, which serves to press and hold the envelope, card, or other article against the face of the platen in position to be printed. It is often desirable to adjust the holder $M^2$ toward one or the other end of roller C. Hence a clamping device—such as shown Figs. 1, 2, and 12—is employed for fastening the supporting-arm $v^2$ to the front bar $s$ of the shifting carriage. As best shown in Figs. 2 and 12, the lower end of arm $v^2$ is formed with a notch or groove $x^2$ to fit the rounded edge of bar $s$, against which the arm $v^2$ is drawn by a lever or clip $y^2$, pivotally attached to arm $v^2$, and urged at its lower end toward said arm or against the front edge of bar $s$ by a set-screw $z^2$, passing through a threaded hole in the clip $y^2$ above the pivot of the latter and bearing against the arm $v^2$, as shown in Figs. 2 and 12. The clip $y^2$ is provided with a series of grooves $x^2$, similar to that of arm $v^2$ and for a like purpose, the series of grooves permitting, however, an adjustment of arm $v^2$ about its point of bearing upon the rear edge of bar $s$ as a center and the clamping of said arm at any desired angle. By thus varying the angle of inclination of arm $v^2$ the distance of roller $w^2$ from the face of roller or platen C may be varied to suit the thickness of different bodies to be printed upon.

For the purpose of varying or adjusting the pressure of roller $w^2$ against platen C or against the envelope, card, or other body to be printed upon a regulating-screw $N^2$ is passed through a threaded hole in arm $v^2$ and arranged to bear against plate $u^2$ near its point of attachment to arm $v^2$, as shown in Fig. 2. By turning this screw the plate $u^2$ may be urged more or less toward the platen or roll C.

Referring now to Figs. 2, 3, 4, 13, and 14, the construction and arrangement of the key-levers and the links connecting them with the type-bars will be explained. O indicates a key-lever, provided, as usual, with a finger-button at its free end, which button is marked to indicate what type or letter is actuated by the key, there being a series of such levers arranged side by side. Each lever consists of a thin and light strip of wood or metal set with its greatest width in a vertical plane, the forward ends of the several levers being extended upward or downward, as required, to bring their finger-buttons to different levels, as indicated. At the rear ends the key-levers are all of uniform size and shape, each sloping downward from the top toward the rear extremity and being formed with a semi-circular notch $a^3$ to receive or to straddle the lower edge of a rib $c^3$, cast upon frame A and extending from side to side thereof at the rear of the machine and on the under side of the raised hollow base of said frame, as seen in Figs. 1, 2, and 3. Each of said levers crosses and rests upon the space-bar N, which is faced on its upper side with leather, cloth, or other material to lessen noise and wear, and each lever when at rest bears at its upper side against a similarly faced or fashioned bar $P^2$, which limits their ascent. The lateral play of the levers is limited and they are kept in proper relative positions at their forward ends by means of wires or pins $d^3$, extending downward from bar $P^2$ and passing between the levers, as shown in Figs. 2 and 4, the thickness of the pins determining the extent of their separation at their forward ends. Whenever a letter-key or the space-bar Q is depressed, the bar N is carried downward away from the remaining key-levers, and it is therefore necessary to provide means for holding up each key-lever independently of bar N. For this purpose there is provided a series of flat springs $e^3$ of the form shown in Figs. 2, 3, and 4—that is to say, bifurcated at their forward ends and bent upward and forward at their rear ends. The forked end of each spring straddles the shank or stem and passes beneath the head of a pin or screw $f^3$, driven into the top of the key-lever to which the spring is applied, and the forwardly-bent rear end is clamped between the under side of the raised base of frame A and a comb-plate $Q^2$, which latter is drawn against said springs with more or less force by means of bolts or screws $g^3$, Figs. 1, 2, and 3. The angle of the spring formed by bending its rear end forward is seated in the angle of a recess $R^2$, formed in the base of frame A to receive the springs and the comb-plate, and thus the springs are held against backward movement, and the comb-plate prevents forward movement. Hence they are kept exactly in position. By tightening or loosening the screws or bolts $g^3$ the lifting force or effect of the springs may be increased or diminished, as desired, and thus the action of the key-levers made stiffer or easier at will. As the key-levers extend to different distances from their fulcrums, it is advisable to make the springs of different lengths to compensate in a measure for the difference in leverage, and thereby render the action of all as nearly uniform as possible. This result is further insured by connecting the type-bars with the key-levers at different distances from the fulcrum of the latter. The comb-plate $Q^2$ is furnished with thin flat pins or reeds $i^3$, which extend downward between the key-levers in the same manner as the pins $d^3$; but owing to their being quite thin the levers are permitted to stand closer together at their rear ends than at their front ends. In this way the desired spread of the levers is secured and maintained.

Key-levers H' and I', by which the carriage is shifted from lower to upper case or from upper to lower case letters, as the case may be, are cut away above bar N, so that they may be depressed without depressing the bar N, and consequently without actuating the letter-spacing mechanism. Being thus unsustained by bar N, it is desirable to provide some support other than the lifting-spring, and a clip $h^3$, Figs. 2, 3, and 4, is therefore secured to each of the levers P of the space bar or key Q near their rear ends, consisting of a piece of metal bent through its middle to form a vertical and a horizontal leaf, the former for attachment to the levers P, as in Fig. 2, and the latter to extend beneath the lever H' or I', as indicated in Fig. 4.

The key-levers O, the levers H' I', and the levers P are each furnished with a metal strap or stirrup $S^2$, passing beneath the key-lever and upward on each side thereof and terminating above the lever in perforated ears, between which ears is placed the perforated lower end of a draw-piece or stem $T^2$, which piece is curved laterally at its upper end and formed with a tubular or perforated boss or block $j^3$, as shown in Figs. 2 and 14. Through the tubular boss $j^3$ is passed the threaded end of a wire or rod $U^2$, which is furnished both above and below the boss with nuts $k^3$, by which its exact adjustment relatively to the draw-piece $T^2$ may be determined and maintained. The upper end of each wire or rod $U^2$ is furnished with a hook $m^3$, Figs. 13 and 14, to pass through an eye in the short arm of one of the type bars or levers F'. Heretofore it has been customary to merely bend over the end of the wire or rod $U^2$ to form this hook; but in order to give thickness for a good screw-thread the rod is now made heavier than formerly and its upper end is drilled longitudinally to receive the shank of the hook $m^3$, which is now made of a separate piece of wire of proper size and is retained in the main wire or rod by indenting the sides of the drilled portion and forcing them into the sides of the shank of the hook, as illustrated in Figs. 13 and 14. The hook is so bent as to cause it to draw directly in line with the axis of the rod $U^2$. The outward curvature of the draw-pieces $T^2$ causes the rods $U^2$ to more effectually clear the type-bars F' and the basket or guard $W^2$, Figs. 2 and 3, against and within which they fall, said basket consisting of an elliptical frame of wire, preferably made of two wires $q^3$, one above another, faced on the inside with a leather band $r^3$, stitched to a backing $s^3$, of felt, listing, or the like, which admits of being readily stitched to the wire frame, thus facilitating the application of the leather facing to the basket. Wires $t^3$ serve to sustain the basket in position. The bar $P^2$, which bears the pins $d^3$ aforesaid, is furnished on its upper face with a cushion of rubber, felt, or other material to deaden the sound occasioned by the upstroke of the key-levers, and for the purpose of limiting the depression of the space bar or key Q it is furnished at or near each end with a hook-shaped hanger $n^3$, each bearing a cushion $o^3$, of rubber or other suitable substance, to form a stop for the levers P P, which carry said key.

Certain features are herein shown and described for the purpose of making complete and clear the operation of certain other parts; but these features which I have incidentally shown and described are not claimed herein, but are shown, described, and claimed in an application filed by me January 20, 1888, Serial No. 261,408, of which the present specification is a division. It is therefore to be understood that such features as are herein shown and described and not specifically claimed are reserved to my aforesaid original application Serial No. 261,408, and the present invention is restricted to those matters which are herein specifically claimed.

Having thus described my invention, what I claim is—

1. In combination with a carriage provided with a rigid and a yielding dog, a rock-shaft, a rack-bar carried by said shaft, a collar loosely encircling the rock-shaft, a screw swiveled in the collar and meshing with worm-teeth in the rock-shaft, and a spring having one end bearing against a fixed part of the machine and the other end attached to the collar, substantially as shown.

2. In combination with the key-levers of a type-writing machine, a series of springs, one for each lever, said springs being connected at their forward end with the key-levers and serving to hold them up against a fixed stop and having their rear ends bent upward and forward, and a clamping-bar bearing upon the rear ends of the springs and serving to hold them firmly against the frame of the machine.

3. In a type-writing machine, the combination, with key-levers, of elevating-springs located above said levers and clamped at one end between the base of the main frame and an adjustable clamping-bar, substantially as described.

4. In combination with frame A, having recess $R^2$, key-levers O, elevating-springs $e^3$, clamping-plate $Q^2$, and screws or bolts $g^3$ for drawing said plate with greater or less force against the rear ends of the springs.

5. In a type-writing machine, the combination, with a series of key-levers having headed pins in their upper sides or edges and with a fulcrum bar or rib above said levers, of a series of springs having forked ends straddling said pins beneath their heads and serving to hold the levers up to the fulcrum bar or rib.

6. In combination with key-bars O and springs $e^3$, plate $Q^2$, provided with rods $i^3$ and arranged to bear upon the rear ends of the springs, and fastening bolts or screws serving to draw the plate $Q^2$ against the springs with greater or less force, whereby the plate is held in position and the tension of the springs is determined.

7. In combination with a type-bar and its actuating-lever, an intermediate connecting-rod consisting of two pieces of wire, one drilled longitudinally and the other inserted and secured in the cavity thus drilled.

8. The connecting-rod $U^2$, provided with hook $m^3$, formed of a separate piece of metal and inserted into a hole drilled in rod $U^2$.

9. The connecting-rod consisting of a body $U^2$, longitudinally drilled at one end, and hook $m^3$, having its shank inserted in the socket thus formed, the metal of the outer body being crimped or compressed upon the shank of the hook and embedded into the same, whereby the two are firmly united.

10. In combination with a type-bar and a key-lever of a type-writing machine, an intermediate connection consisting of draw-piece $T^2$, provided with tubular boss, and rod $U^2$, threaded at one end, passing through said boss and provided above and below the same with nuts $k^3$, substantially as and for the purpose specified.

11. In combination with a key-lever and a type-bar, an outwardly-curved draw-piece connected with the key-lever and a rod extending through the tubular boss of said draw-piece and secured thereto, substantially as set forth.

12. In a type-writing machine, the combination of a roll provided with a ratchet-wheel, a supporting-frame therefor, a hand-lever pivoted in said frame and having a forwardly-extending nose or end to bear upon the periphery of the wheel to limit the motion of the lever, and a pivoted dog carried by said lever and adapted to engage with the teeth of the ratchet-wheel to rotate the same.

13. In combination with the frame B' and roll C, mounted therein and provided with a ratchet-wheel, pulleys $v$ in front and rear of said roll, studs $x$, attached at one end to frame B' and serving to carry the front pulleys $v$, and a hand-lever X, mounted upon one of said studs and provided with a dog or pawl to act upon the teeth of the ratchet-wheel.

14. In a type-writing machine, the combination, with the platen-roll and its actuating-lever, of an elastic plate Z, provided with shoulders, as $c'$, $d'$, and $e'$, and with notches or cavities, as $l'$, $m'$, and $n'$, corresponding therewith, and a fixed stud or pin secured to the platen-frame in the path of the cavities and adapted to enter one or another thereof as the plate is moved to different positions.

15. In combination with a platen-roll and its carrying-frame, an envelope or card holder provided with a clamp having a series of notches or grooves whereby it may be set and secured at different angles upon the frame.

16. In combination with a platen-roll and its frame, a card or envelope holder secured to said frame and an adjusting-screw bearing upon the spring-arm of said holder and serving to force the same toward the platen.

17. In combination with roll C and its frame, the herein-described card or envelope holder, consisting of a rigid supporting-arm provided with a groove in one face, a clip pivoted thereto and provided with a series of grooves, a set-screw for forcing the clip and supporting-arm against opposite edges of the platen-roller frame, an elastic arm secured to the supporting-arm and provided at its free end with a roller, and a set-screw passing through the supporting-arm and bearing against the elastic arm to vary the position or pressure of the roller.

18. In a type-writing machine, a paper guide and holder having grooved arms to fit upon the framing and provided with a screw for drawing said arms against the framing.

19. In combination with lever P, provided with a laterally-projecting clip or support $h^3$, a key-lever, as H' or I', resting upon the clip and supported thereby.

In witness whereof I hereunto set my hand in the presence of two witnesses.

WILLIAM McK. JENNE.

Witnesses:
 IRA W. DANIEL,
 GEO. H. BARLOW.